Aug. 11, 1959    R. J. MURPHY    2,898,639
POWER ACTUATED MOVERS FOR TELESCOPING GYMNASIUM SEAT-STRUCTURES
Filed July 1, 1957    7 Sheets-Sheet 1

INVENTOR.
RAYMOND J. MURPHY
BY

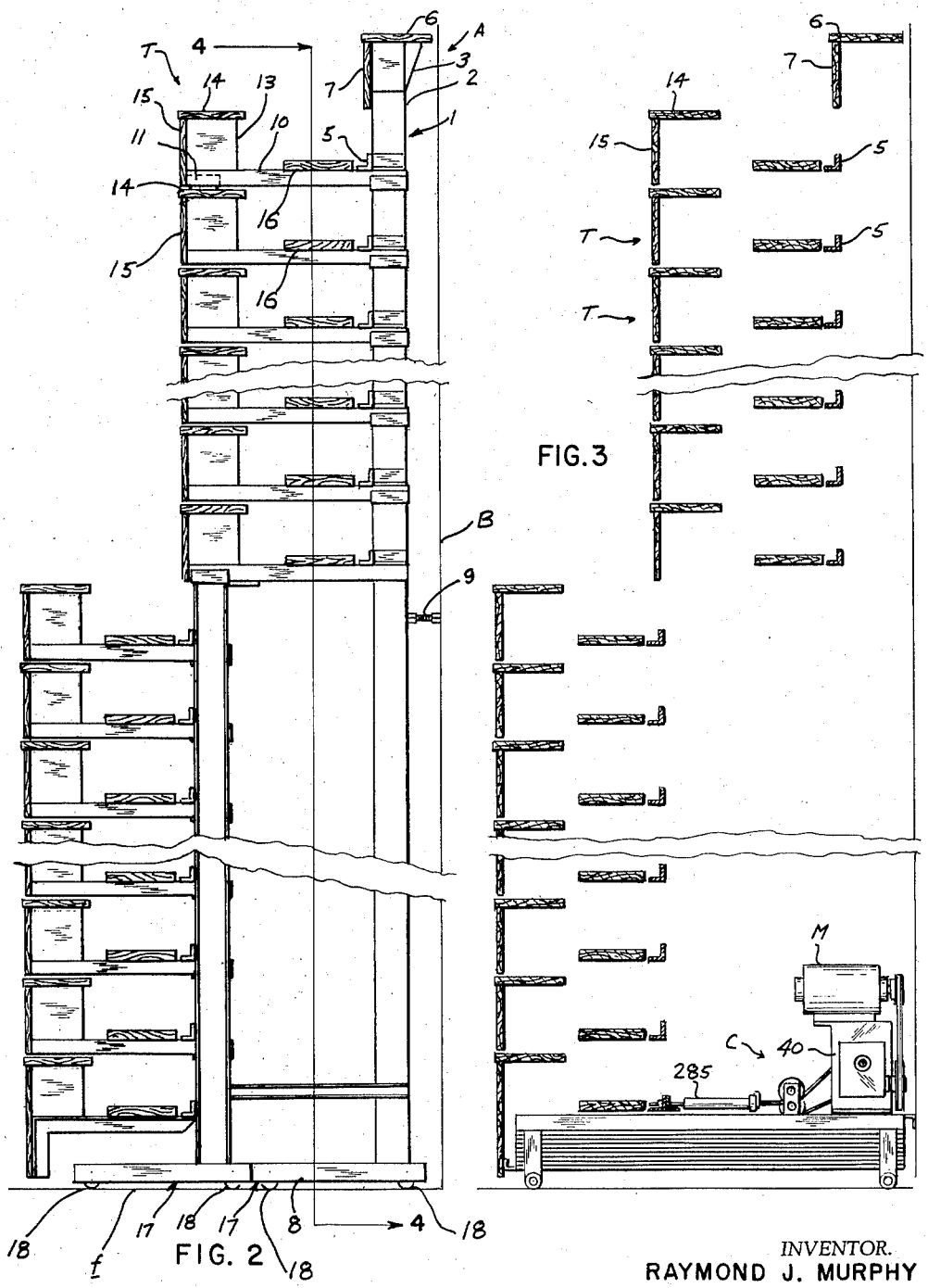

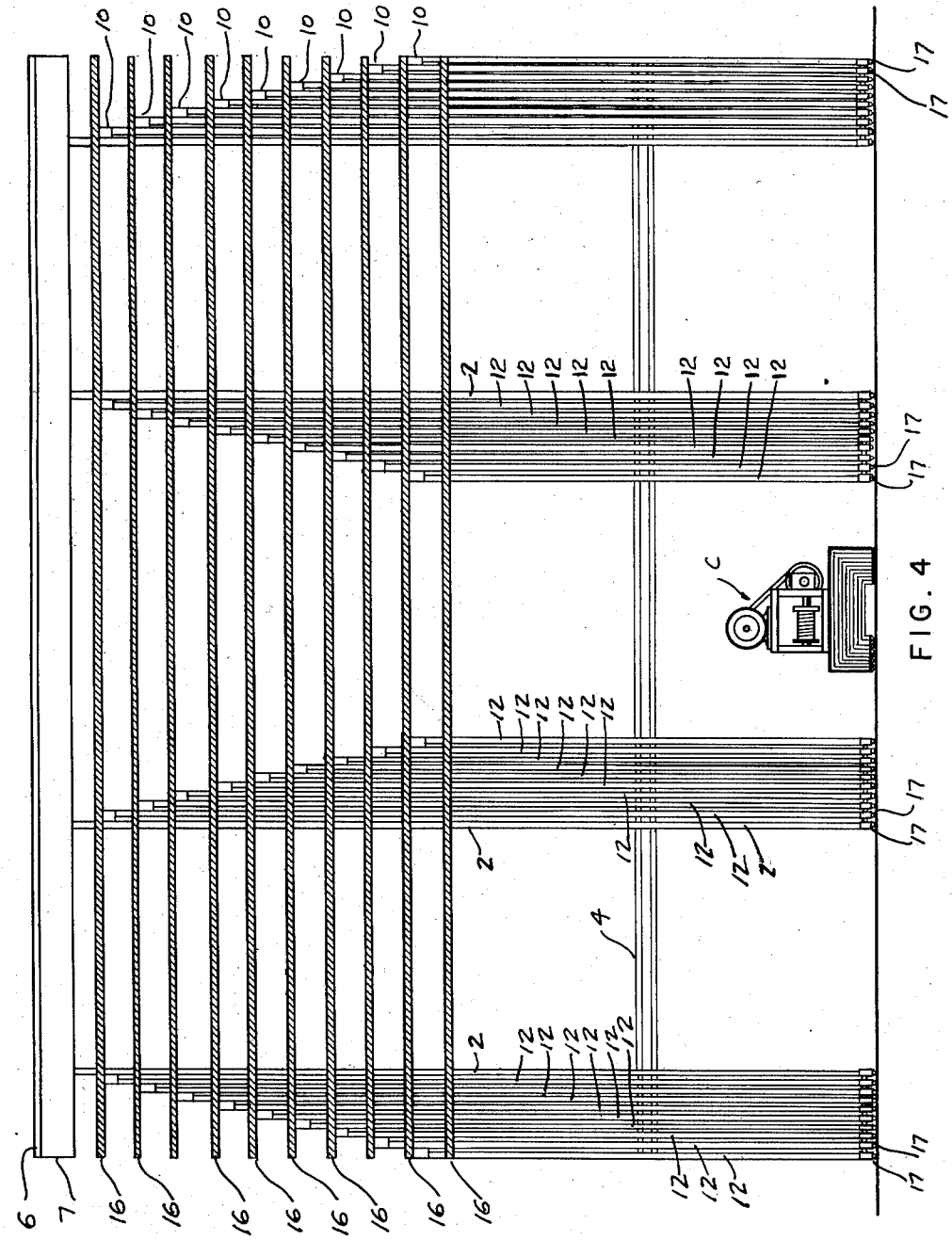

Aug. 11, 1959    R. J. MURPHY    2,898,639
POWER ACTUATED MOVERS FOR TELESCOPING GYMNASIUM SEAT-STRUCTURES
Filed July 1, 1957    7 Sheets-Sheet 4
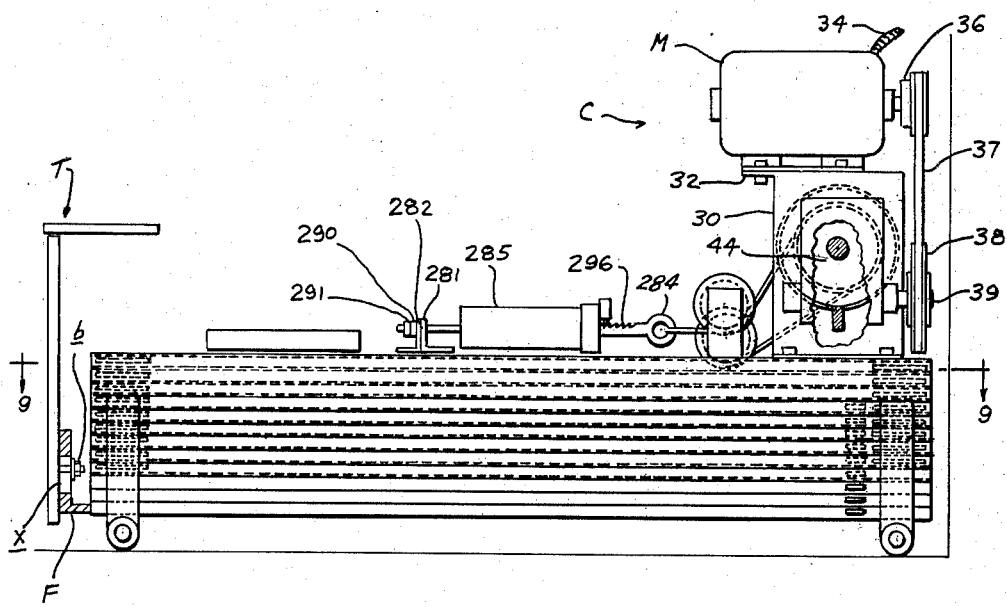
FIG. 5
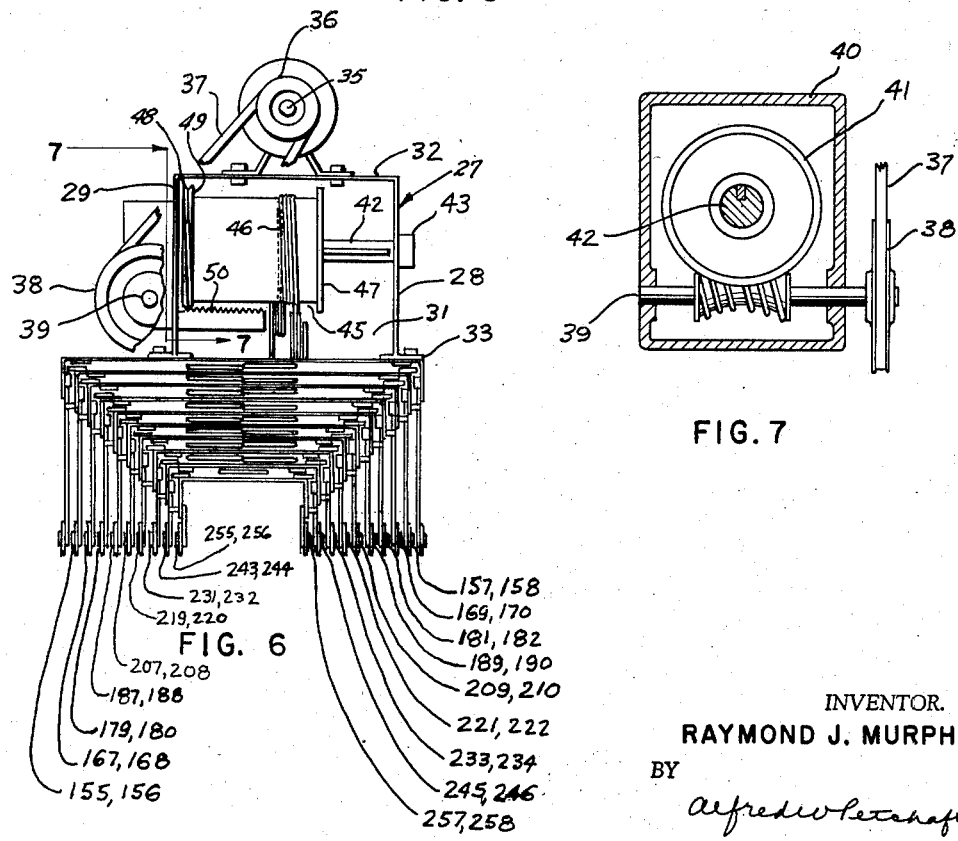
FIG. 6
FIG. 7
INVENTOR.
RAYMOND J. MURPHY
BY

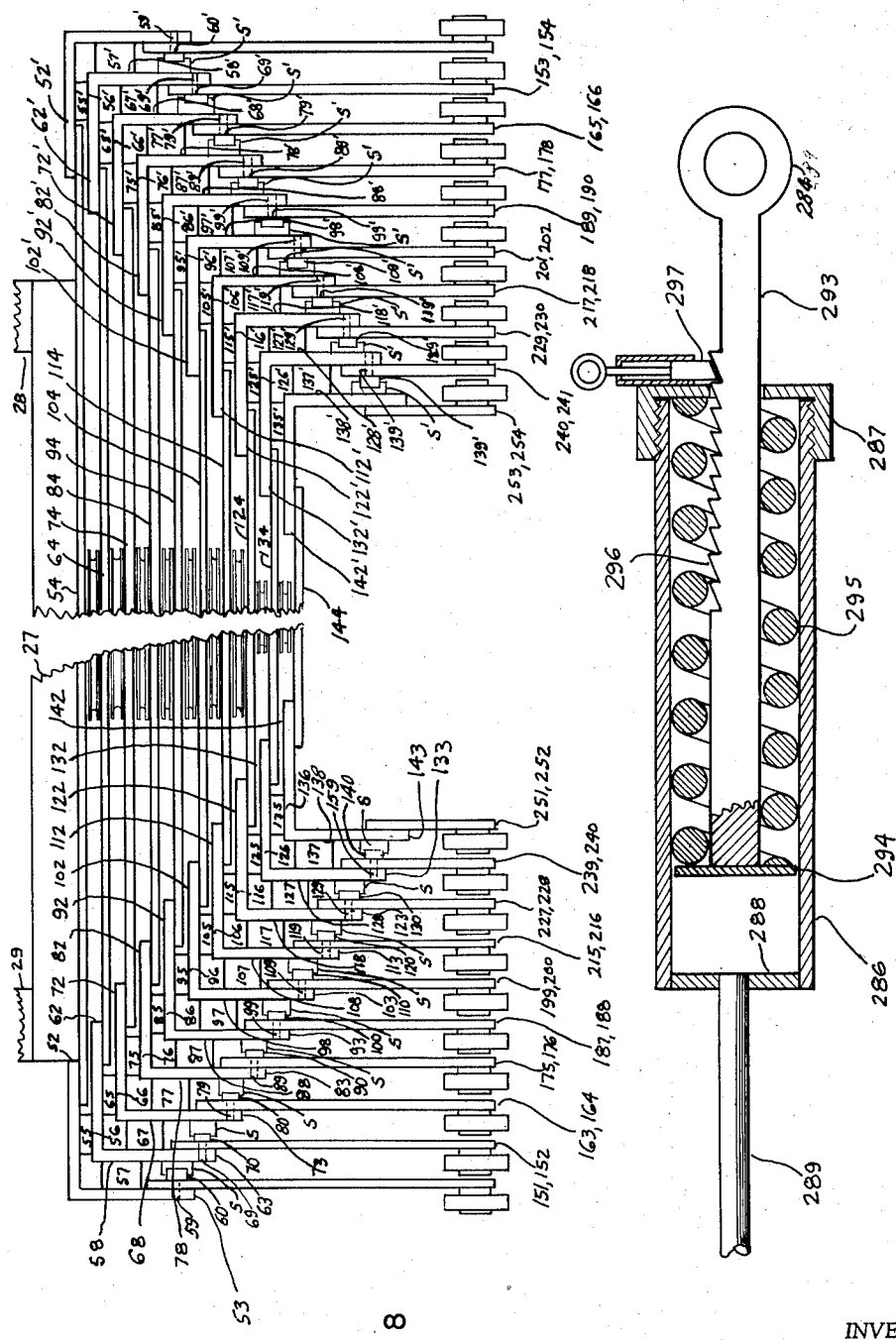

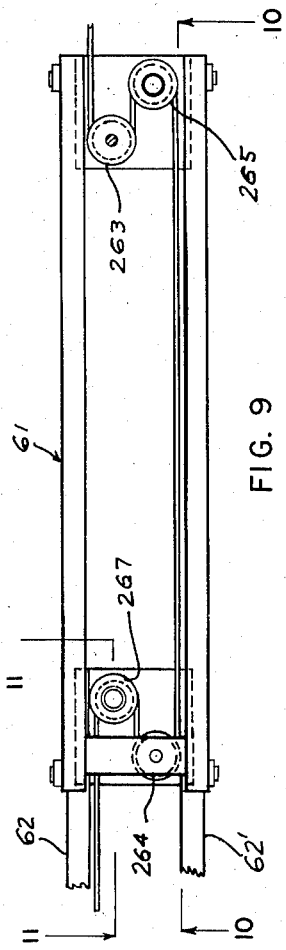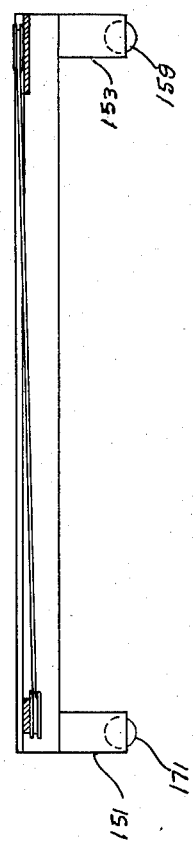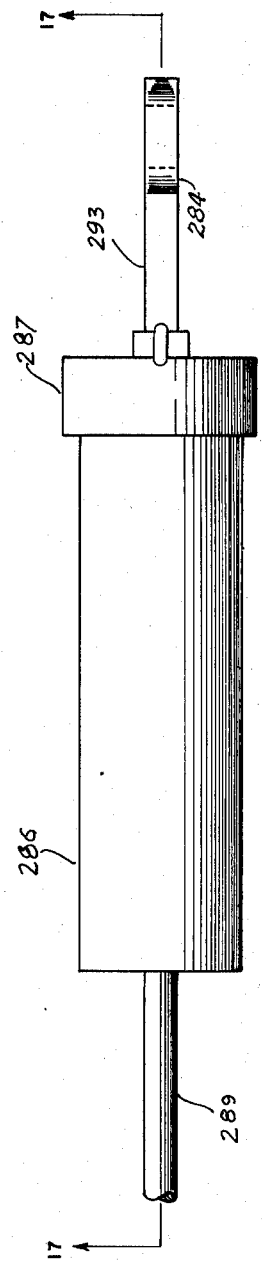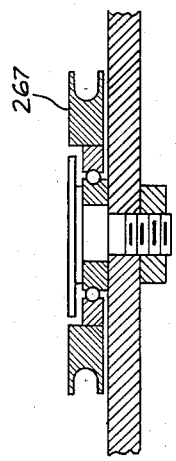

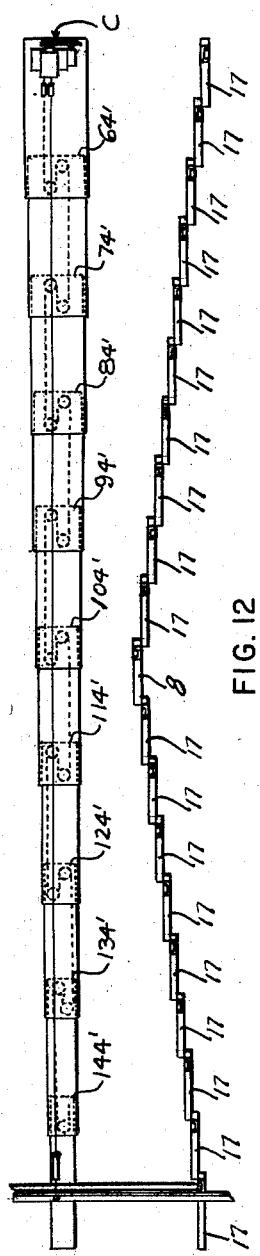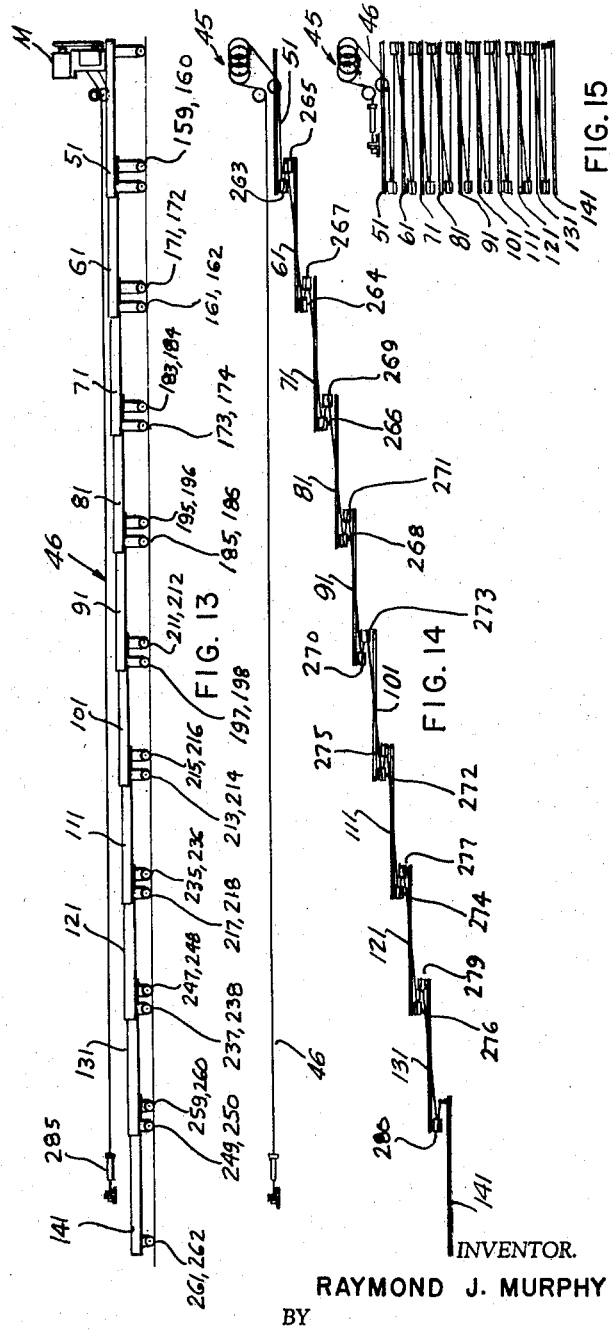

United States Patent Office 2,898,639
Patented Aug. 11, 1959

2,898,639

POWER ACTUATED MOVERS FOR TELESCOPING GYMNASIUM SEAT-STRUCTURES

Raymond J. Murphy, Bonne Terre, Mo., assignor to Fred Medart Manufacturing Co., St. Louis, Mo., a corporation of Missouri Application July 1, 1957, Serial No. 669,301

17 Claims. (Cl. 20—1.126)

This invention relates in general to certain new and useful improvements in gymnasium equipment and, more particularly, to a power actuated mover for telescoping gymnasium seating-structures and the like.

Because of space requirements and the need to afford maximum utility, it has become common practice, in school gymnasiums and similar auditoriums, to employ so-called telescoping seating-structures. Such structures ordinarily consist of a plurality of strong steel-work frames which nest one within the other and carry horizontal seat-boards and foot-boards in suitably spaced relation to provide a tier of bleacher-like seats. When in "closed" position, the entire structure is telescoped compactly against the wall and extends outwardly into the gymnasium only a short distance and the seat-boards, together with the associated foot-boards, lie in vertically spaced relation one above the other. Obviously, the length and height of these seating-structures vary, depending upon the design of the manufacturer and the requirements of the particular gymnasium involved in the installation. For example, such structures ordinarily range in length from twelve to eighteen feet in length, although, occasionally, longer and shorter sections are used. Similarly, such structures range from six or seven tiers of seat-boards up to twenty-four tiers, depending upon the size of the gymnasium. Furthermore, a gymnasium installation usually involves a number of such sections arranged in side-by-side order along one or more walls of the building.

It is, of course, apparent that seating-structures of this type must be strong in order to support the total weight of the number of persons who will be seated thereon and to withstand the live loads resulting from movement. Consequently, telescoping seating-structures are quite heavy and the combined efforts of several workmen are required to move them from open to closed positions. In addition, one workman usually pulls with either greater or lesser force than his co-workers, with the result that the structure will not be pulled out in a straight line so as to be truly perpendicular to the wall upon which the seating-structure is attached. Consequently, when the next adjacent seating-structure is pulled out, there will be marginal interference between the two seating-structures.

It is, therefore, the primary object of the present invention to provide a power driven device for moving telescoping gym seats into open and closed positions.

It is another object of the present invention to provide a gym seat mover of the type stated which can readily be adapted for use with, or attached to, various different types of existing telescoping gymnasium seat-structures.

It is a further object of the present invention to provide a gym seat mover which, in telescoped position, is extremely compact and can be readily extended to an open position, the length of which is many times greater than the length of the closed position.

It is also an object of the present invention to provide a gym seat mover of the type stated having a plurality of telescoping sections which are articulated with respect to each other in a very simple, economical and highly efficient manner, so that the entire structure may be shifted from closed to open position or open to closed position at a relatively rapid rate with a minimum of power loss due to friction and similar inefficiencies.

With the above and other objects in view, my invention resides in the novel features of form, construction, arrangement, and combination of parts presently described and pointed out in the claims.

In the accompanying drawings (seven sheets)—

Fig. 2 is a fragmentary side elevational view of a telescoping gym seat equipped with a gym seat mover constructed in accordance with and embodying the present invention;

Fig. 3 is a fragmentary vertical sectional view taken along line 3—3 of Fig. 1;

Fig. 4 is a vertical sectional view taken along line 4—4 of Fig. 2;

Fig. 5 is a side elevational view of the gym seat mover embodying the present invention;

Fig. 6 is a rear elevational view of the gym seat mover;

Fig. 7 is a fragmentary sectional view taken along line 7—7 of Fig. 6;

Fig. 8 is a front elevational view of the gym seat mover;

Fig. 9 is a sectional view taken along line 9—9 of Fig. 5;

Figure 1:
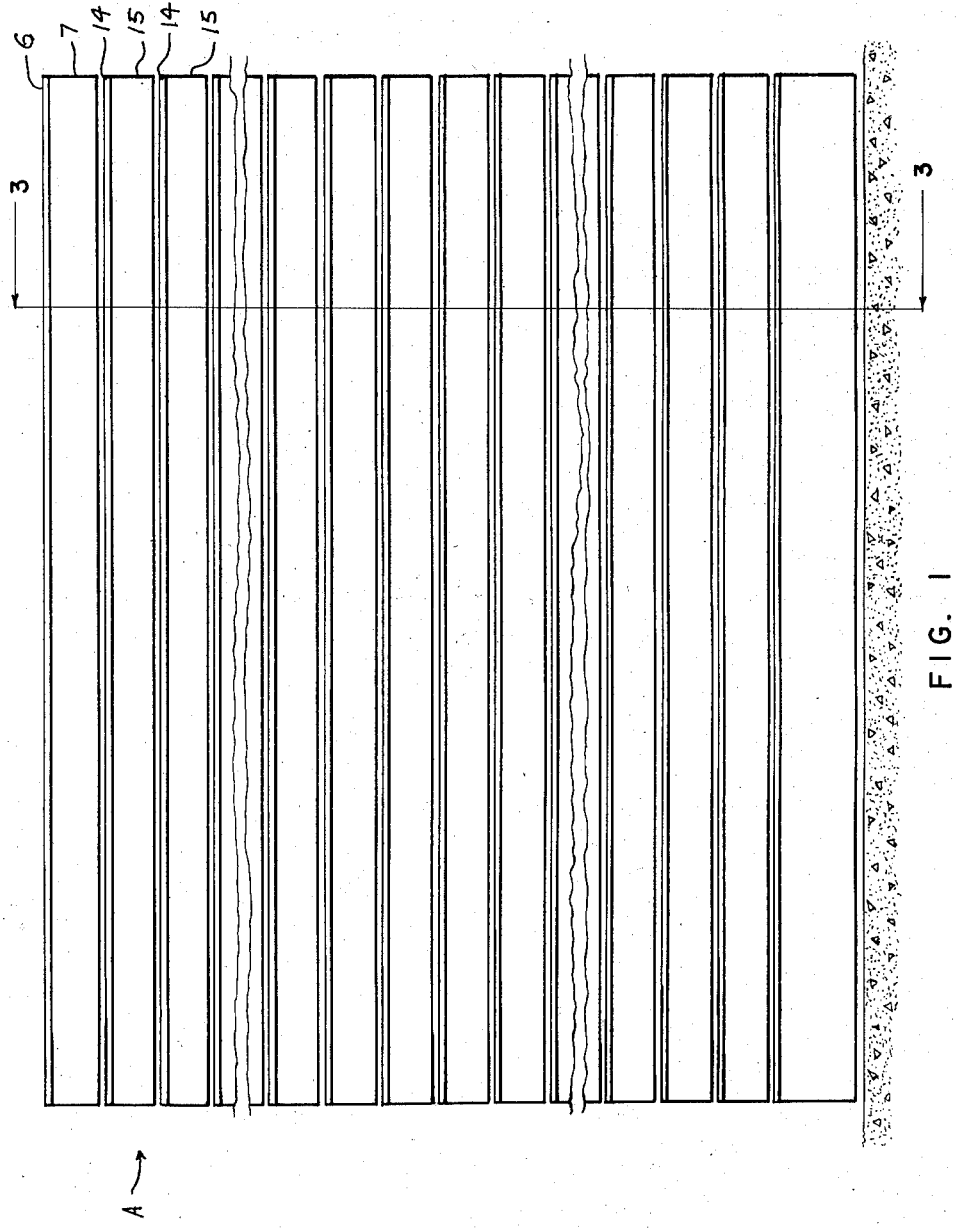
Fig. 1 is a fragmentary front elevational view of a telescoping gym seat (in closed or retracted position) equipped with a gym seat mover constructed in accordance with and embodying the present invention.

Figs. 10 and 11 are fragmentary sectional views taken along lines 10—10 and 11—11, respectively, of Fig. 9;

Fig. 12 is a fragmentary and schematic top plan view of the gym seat mover in fully extended position;

Fig. 13 is a side elevational view of the gym seat mover in fully extended position;

Fig. 14 is a schematic view of the pulley system forming a part of the present invention, showing said pulley system in fully extended position;

Fig. 15 is a schematic view of the pulley system forming a part of the present invention, showing said pulley system in closed or retracted position;

Fig. 16 is a top plan view of a cable tensioning mechanism forming a part of the present invention; and Fig. 17 is a longitudinal sectional view taken along line 17—17 of Fig. 16.

Referring now in more detail and by reference characters to the drawings, which illustrate a preferred embodiment of the present invention, A designates a telescoping seating-structure or bleacher which comprises a plurality of outwardly shiftable tiers T. More specifically, the rearmost tier T includes a main or rear frame 1 consisting of a suitable plurality of transversely spaced oblong rectangular uprights or so called panels 2, each, in turn, being cross-connected at their upper ends by means of a connecting plate 3. Adjacent their lower ends, the uprights or panels 2 are cross-connected by a formed channel plate 4 which is welded, riveted, or otherwise rigidly attached thereto and the uprights or panels 2 are likewise cross-connected by an angle member 5.

Mounted upon the upper end of, and extending horizontally between the uprights or panels 2, is a seat-board 6 and similarly mounted directly beneath, and extending along, the seat-board 6 is a fascia board 7. At its lower end, each of the uprights or panels 2 is rigidly welded to a horizontal foot-forming frame 8 which is adapted to rest directly upon the gym floor f so that, when each of the uprights or panels 2 is rigidly attached to a conventional gymnasium wall or similar masonry structure B, by means of conventional tie bolts 9, the entire top or main seating tier T will be rigid, permanent, and stationary.

Hingedly secured to each of the uprights or panels 2, in downwardly spaced relation to the seat-board 6, is a forwardly extending horizontal element or beam 10 for slidable track-forming engagement within a slide-fitting 11, which is, in turn, rigidly welded to the upper end of an auxiliary upright or panel section 12, substantially similar to the uprights or panels 2 previously described. Welded to and extending upwardly from the forward end of the beam 10 is a seat-mounting plate 13 for supporting a seat-board 14 and a fascia board 15, the latter being substantially similar to the previously described seat-board 6 and fascia board 7. Also bolted or otherwise suitably secured to the upper side of the beam 10 and located below and between the seat-boards 6, 14, is a foot-board 16. Thus, when the seating-structure is in operative use, a spectator may be seated upon the seat-board 6 and rest his feet upon the foot-board 16 directly below and in front of the fascia board 7, the proportion of these members being such as to form a comfortable seat for the average adult. It will, of course, be understood in this connection that these seat dimensions are ordinarily used in gymnasiums associated with high scools, junior colleges and similar institutions where young men and women and adults will constitute the body of spectators. If the seating-structure is designed for use in elementary or primary schools where children will be the spectators, it is possible to make the dimensions of the entire structure somewhat smaller to accommodate the smaller users.

Each of the uprights or panels 12 corresponds to one of the uprights or panels 2 and there are, of course, a similar plurality of such uprights or panels 12, each being provided with a channel plate 4 cross-connected in the same manner as the panels 2. At their lower ends, each of the vertical uprights or panels 12 is welded rigidly to a horizontal downwardly opening U-shaped channel 16 in the provision of an under-frame carriage generally designated by the reference numeral 17, thereby forming a first sliding or telescoping tier T which can be shifted inwardly toward the wall B in vertically aligned underlying relation to the main seating tier A.

As will be noted by reference to Figs. 1 and 2, the telescopic bleacher of the present invention consists of a plurality of substantially identical tiers T, each consisting of a plurality of laterally aligned panels 12 formed by and having a seat-board 14, a fascia board 15, and a footboard 16, all supported upon an under-frame 17 and laterally connected by tie channels 4 and angle members 5. Although, as shown in Fig. 4 the rearmost tier T consists of four laterally spaced upright panels 2 and each of the other tiers T similarly consists of four laterally spaced upright panels 12, nevertheless it should be understood that each tier T may include any number of laterally spaced panels, such as the panels 2 in the case of the rearmost tier T or the panels 12 in the case of the successive interneted tiers T, depending upon the length of the seating-structure and, similarly, any number of tiers T may be employed, depending upon the number of seats desired and the height to which the structure is to be carried. There is, of course, a reasonable and practical limit of height, but, in actual installations, it has been found that it is possible to fabricate seating-structures of the present invention with at least as many as twenty-one tiers T rising to an overall height at the wall of approximately nineteen feet.

Each under-frame carriage 17 is resiliently connected to a roller 18 which rests upon the gymnasium floor. When the telescopic bleacher structure is unloaded, each of the panels 2 and its related structure will be resiliently held upwardly with respect to the floor so that the entire seating-structure A will roll freely inwardly and outwardly. However, when appreciable weight, such as the weight of a spectator, is brought to bear on the structure, the entire structure will shift downwardly a short distance with respect to the rollers 18 and come to rest immovably in stationary position on the floor so that the weight of the spectators will, thus, be carried through the panels 2, 12, into the under-frames 17, which, in turn, rest directly upon the floor.

Provided for co-operation with the seating-structure A is a seat-mover or extensor C which comprises a stationary rectilinear chassis 27 fabricated in the usual manner from angle-iron and including four vertical upright members 28, 29, 30, 31, which are connected to each other by a rectangular top frame 32 and a rectangular bottom frame 33. Mounted by any suitable conventional means upon the top frame 32 is an electric motor M provided with a conventional electrical connector cord 34, by which it may be connected to any available source of electrical power and switch control (not shown). The switch control can, of course, be located at a convenient position either proximate to or remote from the seating-structure A. The drive shaft 35 of the motor M is equipped with a pulley 36, which is, in turn, connected by a V-belt 37 to a driven pulley 38 keyed upon a shaft 39 of a speed-reduction unit 40, the latter consisting of a worm pinned or otherwise rigidly mounted on the shaft 39 and a worm wheel 41, which is, in turn, pinned upon a shaft 42 operatively mounted in, and extending horizontally between, journals 43, 44, mounted in the chassis 27.

Splined upon the shaft 42, for lengthwise shiftable movement therealong and rotation therewith, is a cable-drum 45 adapted for receiving a plurality of turns of a cable 46 which is wrapped therearound. The drum 45 is also provided at its opposite ends with diametrally enlarged annular end frames 47, 48, the latter being relatively wide and having a peripheral thread 49, the lead of which is substantially equivalent to the diameter of the cable 46. The thread 49 meshes with the teeth of a screw-rack 50 which is rigidly mounted in the chassis 27, in spaced parallel relation to the shaft 42. Consequently, as the drum 45 is rotated and the cable 46 winds thereon, the drum will shift itself lengthwise to-and-fro along the shaft 42 so that the runs of the cable 46 come into, and away from, the drum 45 at all times in the same positions relative to the chassis 27.

Rigidly mounted centrally of the chassis 27 upon the button frame 33 and projecting horizontally forwardly therefrom is an elongated rectangular guide frame 51 also formed of relatively strong structural frame members and including two parallel side rails 52, 52', having downwardly projecting vertical flanges 53, 53', respectively, and being connected at their outer ends by a transversely extending horizontal end plate 54. At suitable spaced locations along its length, the side rail 52 is rigidly provided with downwardly projecting slide blocks 55 having downwardly presented horizontal slide faces 56 and the flange 53 is similarly provided with inwardly projecting matching slide blocks 57 having inwardly presented vertical slide faces 58. Similarly, the side rail 52' is provided at matching locations along its length with downwardly presented slide blocks 55' having downwardly presented slide faces 56' and the flange 53' is provided with inwardly projecting slide blocks 57' having inwardly presented vertical slide faces 58'. Also rigidly mounted on, and projecting inwardly from, the flange 53 is a stud 59 having an enlarged stop-forming head 60 and similarly mounted on the flange 53' is a stud 59' having an enlarged stop-forming head 60', the studs 59, 59', being axially aligned crosswise of the guide frame 51, for purposes presently more fully appearing.

Slidably telescoped within the guide frame 51 is an elongated rectangular frame 61 which is similar in shape and construction to said guide frame 51 and comprises two parallel side rails 62, 62', having downwardly projecting vertical flanges 63, 63', respectively, and being connected at their forward and rearward ends by transversely extending horizontal end plates 64, 64'. At suitably spaced locations along its length, the side rail 62 is rigidly provided with downwardly projecting slide blocks 65 having downwardly presented horizontal slide faces 66 and the flange 63 is similarly provided with inwardly projecting matching slide blocks 67 having inwardly presented vertical slide faces 68. Similarly, the side rail 62' is provided at matching locations along its length with downwardly presented slide blocks 65' having downwardly presented slide faces 66' and the flange 63' is provided with inwardly projecting slide blocks 67' having inwardly presented vertical slide faces 68'. Also rigidly mounted on, and projecting inwardly from, the flange 63 is a stud 69 having an enlarged stop-forming head 70 and similarly mounted on the flange 63' is a stud 69' having an enlarged stop-forming head 70'. The upwardly presented faces of the side rails 62, 62', bear slidably against the slide faces 56, 56', of the guide frame 51, and the outwardly presented lateral faces of the flanges 63, 63', bear slidably against the slide faces 58, 58', respectively, of the guide frame 51. Finally, the flanges 63, 63', are respectively provided, at their rearward ends, with laterally outwardly projecting stop abutments s, s', which are in line with and abut against the studs 59, 59', respectively, of the guide frame 51 when the extensible frame 61 is shifted outwardly with respect to the guide frame 51.

Slidably telescoped within the extensible frame 61 in a second extensible frame 71 which is similar in shape and construction to said extensible frame 61 and comprises two parallel side rails 72, 72', having downwardly projecting vertical flanges 73, 73', respectively, and being connected at their forward and rearward ends by transversely extending horizontal end plates 74, 74'. At suitably spaced locations along its length, the side rail 72 is rigidly provided with downwardly projecting slide blocks 75 having downwardly presented horizontal slide faces 76 and the flange 73 is similarly provided with inwardly projecting matching slide blocks 77 having inwardly presented vertical slide faces 78. Similarly, the side rail 72' is provided at matching locations along its length with downwardly presented slide blocks 75' having downwardly presented slide faces 76' and the flange 73' is provided with inwardly projecting slide blocks 77' having inwardly presented vertical slide faces 78'. Also rigidly mounted on, and projecting inwardly from, the flange 73 is a stud 79 having an enlarged stop-forming head 80 and similarily mounted on the flange 73' is a stud 79' having an enlarged stop-forming head 80'. The upwardly presented faces of the side rails 72, 72', bear slidably against the slide faces 66, 66', of the extensible frame 61, and the outwardly presented lateral faces of the flanges 73, 73', bear slidably against the slide faces 68, 68', respectively, of the extensible frame 61. Finally, the flanges 73, 73', are respectively provided, at their rearward ends, with laterally outwardly projecting stop abutments s, s', which are in line with and abut against the studs 69, 69', respectively, of the extensible frame 61.

Slidably telescoped within the extensible frame 71 is a third extensible frame 81 which is similar in shape and construction to said extensible frame 71 and comprises two parallel side rails 82, 82', having downwardly projecting vertical flanges 83, 83', respectively, and being connected at their forward and rearward ends by transversely extending horizontal end plates 84, 84'. At suitably spaced locations along its length, the side rail 82 is rigidly provided with downwardly projecting slide blocks 85 having downwardly presented horizontal slide faces 86 and the flange 83 is similarly provided with inwardly projecting matching slide blocks 87 having inwardly presented vertical slide faces 88. Similarly, the side rail 82' is provided at matching locations along its length with downwardly presented slide blocks 85' having downwardly presented slide faces 86' and the flange 83' is provided with inwardly projecting slide blocks 87' having inwardly presented vertical slide faces 88'. Also rigidly mounted on, and projecting inwardly from, the flange 83 is a stud 89 having an enlarged stop-forming head 90 and similarly mounted on the flange 83' is a stud 89' having an enlarged stop-forming head 90'. The upwardly presented faces of the side rails 82, 82', bear slidably against the slide faces 76, 76', of the extensible frame 71, and the outwardly presented lateral faces of the flanges 83, 83', bear slidably against the slide faces 78, 78', respectively, of the extensible frame 71. Finally, the flanges 83, 83', are respectively provided, at their rearward ends, with laterally outwardly projecting stop abutments s, s', which are in line with and abut against the studs 79, 79', respectively, of the extensible frame 71.

Slidably telescoped within the extensible frame 81 is a fourth extensible frame 91 which is similar in shape and construction to said extensible frame 81 and comprises two parallel side rails 92, 92', having downwardly projecting vertical flanges 93, 93', respectively, and being connected at their forward and rearward ends by transversely extending horizontal end plates 94, 94'. At suitably spaced locations along its length, the side rail 92 is rigidly provided with downwardly projecting slide blocks 95 having downwardly presented horizontal slide faces 96 and the flange 93 is similarly provided with inwardly projecting matching slide blocks 97 having inwardly presented vertical slide faces 98. Similarly, the side rail 92' is provided at matching locations along its length with downwardly presented slide blocks 95' having downwardly presented slide faces 96' and the flange 93' is provided with inwardly projecting slide blocks 97' having inwardly presented vertical slide faces 98'. Also rigidly mounted on, and projecting inwardly from, the flange 93 is a stud 99 having an enlarged stop-forming head 100 and similarly mounted on the flange 93' is a stud 99' having an enlarged stop-forming head 100'. The upwardly presented faces of the side rails 92, 92', bear slidably against the slide faces 86, 86', of the extensible frame 81, and the outwardly presented lateral faces of the flanges 93, 93', bear slidably against the slide faces 88, 88', respectively, of the extensible frame 81. Finally, the flanges 93, 93', are respectively provided, at their rearward ends, with laterally outwardly projecting stop abutments s, s', which are in line with and abut against the studs 89, 89', respectively, of the extensible frame 81.

Slidably telescoped within the extensible frame 91 is a fifth extensible frame 101 which is similar in shape and construction to said extensible frame 91 and comprises two parallel side rails 102, 102', having downwardly projecting vertical flanges 103, 103', respectively, and being connected at their forward and rearward ends by transversely extending horizontal end plates 104, 104'. At suitably spaced locations along its length, the side rail 102 is rigidly provided with downwardly projecting slide blocks 105 having downwardly presented horizontal slide faces 106 and the flange 103 is similarly provided with inwardly projecting matching slide blocks 107 having inwardly presented vertical slide faces 108. Similarly, the side rail 102' is provided at matching locations along its length with downwardly presented slide blocks 105' having downwardly presented slide faces 106' and the flange 103' is provided with inwardly projecting slide blocks 107' having inwardly presented vertical slide faces 108'. Also rigidly mounted on, and projecting inwardly from, the flange 103 is a stud 109 having an enlarged stop-forming head 110 and similarly mounted on the flange 103' is a stud 109' having an enlarged stop-forming head 110'. The upwardly presented faces of the side rails 102, 102', bear slidably against the slide faces 96, 96', of the extensible frame 91, and the outwardly presented lateral faces of the flanges 103, 103', bear slidably against the slide faces 98, 98′, respectively, of the extensible frame 91. Finally, the flanges 103, 103′, are respectively provided, at their rearward ends, with laterally outwardly projecting stop abutments s, s′, which are in line with and abut against the studs 99, 99′, respectively, of the extensible frame 91.

Slidably telescoped within the extensible frame 101 is a sixth extensible frame 111 which is similar in shape and construction to said extensible frame 101 and comprises two parallel side rails 112, 112′, having downwardly projecting vertical flanges 113, 113′, respectively, and being connected at their forward and rearward ends by transversely extending horizontal end plates 114, 114′. At suitably spaced locations along its length, the side rail 112 is rigidly provided with downwardly projecting slide blocks 115 having downwardly presented horizontal slide faces 116 and the flange 113 is similarly provided with inwardly projecting matching slide blocks 117 having inwardly presented vertical slide faces 118. Similarly, the side rail 112′ is provided at matching locations along its length with downwardly presented slide blocks 115′ having downwardly presented slide faces 116′ and the flange 113′ is provided with inwardly projecting slide blocks 117′ having inwardly presented vertical slide faces 118′. Also rigidly mounted on, and projecting inwardly from, the flange 113 is a stud 119 having an enlarged stop-forming head 120 and similarly mounted on the flange 113′ is a stud 119′ having an enlarged stop-forming head 120′. The upwardly presented faces of the side rails 112, 112′, bear slidably against the slide faces 106, 106′, of the extensible frame 101, and the outwardly presented lateral faces of the flanges 113, 113′, bear slidably against the slide faces 108, 108′, respectively, of the extensible frame 101. Finally, the flanges 113, 113′, are respectively provided, at their rearward ends, with laterally outwardly projecting stop abutments s, s′, which are in line with and abut against the studs 109, 109′, respectively, of the extensible frame 101.

Slidably telescoped within the extensible frame 111 is a seventh extensible frame 121 which is similar in shape and construction to said extensible frame 111 and comprises two parallel side rails 122, 122′, having downwardly projecting vertical flanges 123, 123′, respectively, and being connected at their forward and rearward ends by transversely extending horizontal end plates 124, 124′. At suitably spaced locations along its length, the side rail 122 is rigidly provided with downwardly projecting slide blocks 125 having downwardly presented horizontal slide faces 126 and the flange 123 is similarly provided with inwardly projecting matching slide blocks 127 having inwardly presented vertical slide faces 128. Similarly, the side rail 122′ is provided at matching locations along its length with downwardly presented slide blocks 125′ having downwardly presented slide faces 126′ and the flange 123′ is provided with inwardly projecting slide blocks 127′ having inwardly presented vertical slide faces 128′. Also rigidly mounted on, and projecting inwardly from, the flange 123 is a stud 129 having an enlarged stop-forming head 130 and similarly mounted on the flange 123′ is a stud 129′ having an enlarged stop-forming head 130′. The upwardly presented faces of the side rails 122, 122′, bear slidably against the slide faces 116, 116′, of the extensible frame 111, and the outwardly presented lateral faces of the flanges 123, 123′, bear slidably against the slide faces 118, 118′, respectively, of the extensible frame 111. Finally, the flanges 123, 123′, are respectively provided, at their rearward ends, with laterally outwardly projecting stop abutments s, s′, which are in line with and abut against the studs 119, 119′, respectively, of the extensible frame 111.

Slidably telescoped within the extensible frame 121 is an eighth extensible frame 131 which is similar in shape and construction to said extensible frame 121 and comprises two parallel side rails 132, 132′, having downwardly projecting vertical flanges 133, 133′, respectively, and being connected at their forward and rearward ends by transversely extending horizontal end plates 134, 134′. At suitably spaced locations along its length, the side rail 132 is rigidly provided with downwardly projecting slide blocks 135 having downwardly presented horizontal slide faces 136 and the flanges 133 is similarly provided with inwardly projecting matching slide blocks 137 having inwardly presented vertical slide faces 138. Similarly, the side rail 132′ is provided at matching locations along its length with downwardly presented slide blocks 135′ having downwardly presented slide faces 136′ and the flange 133′ is provided with inwardly projecting slide blocks 137′ having inwardly presented vertical slide faces 138′. Also rigidly mounted on, and projecting inwardly from, the flange 133 is a stud 139 having an enlarged stop-forming head 140 and similarly mounted on the flange 133′ is a stud 139′ having an enlarged stop-forming head 140′. The upwardly presented faces of the side rails 132, 132′, bear slidably against the slide faces 126, 126′, of the extensible frame 121, and the outwardly presented lateral faces of the flanges 133, 133′, bear slidably against the slide faces 128, 128′, respectively, of the extensible frame 121. Finally, the flanges 133, 133′, are respectively provided, at their rearward ends, with laterally outwardly projecting stop abutments s, s′, which are in line with and abut against the studs 129, 129′, respectively, of the extensible frame 121.

Slidably telescoped within the extensible frame 131 is a ninth extensible frame 141 which is similar in shape and construction to said extensible frame 131 and comprises two parallel side rails 142, 142′, having downwardly projecting vertical flanges 143, 143′, respectively, and being connected at their forward and rearward ends by transversely extending horizontal end plates 144, 144′. At suitably spaced locations along its length, the side rail 142 is rigidly provided with downwardly projecting slide blocks 145 having downwardly presented horizontal slide faces 146 and the flange 143 is similarly provided with inwardly projecting matching slide blocks 147 having inwardly presented vertical slide faces 148. Similarly, the side rail 142′ is provided at matching locations along its length with downwardly presented slide blocks 145′ having downwardly presented slide faces 146′ and the flange 143′ is provided with inwardly projecting slide blocks 147′ having inwardly presented vertical slide faces 148′. Also rigidly mounted on, and projecting inwardly from, the flange 143 is a stud 149 having an enlarged stop-forming head 150 and similarly mounted on the flange 143′ is a stud 149′ having an enlarged stop-forming head 150′. The upwardly presented faces of the side rails 142, 142′, bear slidably against the slide faces 136, 136′, of the extensible frame 131, and the outwardly presented lateral faces of the flanges 143, 143′, bear slidably against the slide faces 138, 138′, respectively, of the extensible frame 131. Finally, the flanges 143, 143′, are respectively provided, at their rearward ends, with laterally outwardly projecting stop abutments s, s′, which are in line with and abut against the studs 139, 139′, respectively, of the extensible frame 131.

The extensible frame 61 is provided at its four corners with depending plates 151, 152, 153, 154, which are welded or otherwise suitably secured upon, and extend downwardly from, the flanges 63, 63′, respectively. At their lower ends, the plates 151, 152, 153, 154, are provided with short outwardly projecting horizontal wheel-spindles 155, 156, 157, 158, respectively, for operatively supporting floor-engaging rollers 159, 160, 161, 162. The wheel-spindles 155, 156, 157, 158, and the associated rollers 159, 160, 161, 162, are relatively narrow in the transverse horizontal direction so as to lie conveniently and without interference within the space between the flanges 53, 53′, and the flanges 63, 63′, and are of proper vertical height so as to support the extensible frame 61 in substantially horizontal nested position symmetrically within the guide frame 51.

Similarly, the second extensible frame 71 is provided at its four corners with depending plates 163, 164, 165, 166, which are welded or otherwise suitably secured upon, and extend downwardly from, the flangese 73, 73', respectively. At their lower ends, the plates 163, 164, 165, 166, are provided with short outwardly projecting horizontal wheel-spindles 167, 168, 169, 170, respectively, for operatively supporting floor-engaging rollers 171, 172, 173, 174. The wheel-spindles 167, 168, 169, 170, and the associated rollers 171, 172, 173, 174, are relatively narrow in the transverse horizontal direction so as to lie conveniently and without interference within the space between the flanges 63, 63', and the flanges 73, 73', and are of proper vertical height so as to support the extensible frame 71 in substantially horizontal nested position symmetrically within the extensible frame 61.

Similarly, the third extensible frame 81 is provided at its four corners with depending plates 175, 176, 177, 178, which are welded or otherwise suitably secured upon, and extend downwardly from, the flanges 83, 83', respectively. At their lower ends, the plates 175, 176, 177, 178, are provided with short outwardly projecting horizontal wheel-spindles 179, 180, 181, 182, respectively, for operatively supporting floor-engaging rollers 183, 184, 185, 186. The wheel-spindles 179, 180, 181, 182, and the associated rollers 183, 184, 185, 186, are relatively narrow in the transverse horizontal direction so as to lie conveniently and without interference within the space between the flanges 73, 73', and the flanges 83, 83', and are of proper vertical height so as to support the extensible frame 81 in substantially horizontal nested position symmetrically within the extensible frame 71.

Similarly, the fourth extensible frame 91 is provided at its four corners with depending plates 187, 188, 189, 190, which are welded or otherwise suitably secured upon, and extend downwardly from, the flanges 93, 93', respectively. At their lower ends, the plates 187, 188, 189, 190, are provided with short outwardly projecting horizontal wheel-spindles 191, 192, 193, 194, respectively, for operatively supporting floor-engaging rollers 195, 196, 197, 198. The wheel-spindles 191, 192 193, 194, and the associated rollers 195, 196, 197, 198, are relatively narrow in the transverse horizontal direction so as to lie conveniently and without interference within the space between the flanges 83, 83', and the flanges 93, 93', and are of proper vertical height so as to support the extensible frame 91 in substantially horizontal nested position symmetrically within the extensible frame 81.

Similarly, the fifth extensible frame 101 is provided at its four corners with depending plates 199, 200, 201, 202, which are welded or otherwise suitably secured upon, and extend downwardly from, the flanges 103, 103', respectively. At their lower ends, the plates 203, 204, 205, 206, are provided with short outwardly projecting horizontal wheel-spindles 207, 208, 209, 210, respectively for operatively supporting floor-engaging rollers 211, 212, 213, 214. The wheel-spindles 207, 208, 209, 210, and the associated rollers 211, 212, 213, 214, are relatively narrow in the transverse horizontal direction so as to lie conveniently and without interference within the space between the flanges 93, 93', and the flanges 103, 103', and are of proper vertical height so as to support the extensible frame 101 in substantially horizontal nested position symmetrically within the extensible frame 91.

Similarly, the sixth extensible frame 111 is provided at its four corners with depending plates 215, 216, 217, 218, which are welded or otherwise suitably secured upon, and extend downwardly from, the flanges 113, 113', respectively. At their lower ends, the plates 215, 216, 217, 218, are provided with short outwardly projecting horizontal wheel-spindles 219, 220, 221, 222, respectively, for operatively supporting floor-engaging rollers 223, 224, 225, 226. The wheel-spindles 219, 220, 221, 222, and the associated rollers 223, 224, 225, 226, are relatively narrow in the transverse horizontal direction so as to lie conveniently and without interference within the space between the flanges 103, 103', and the flanges 113, 113', and are of proper vertical height so as to support the extensible frame 111 in substantially horizontal nested position symmetrically within the extensible frame 101.

Similarly, the seventh extensible frame 121 is provided at its four corners with depending plates 227, 228, 229, 230, which are welded or otherwise suitably secured upon, and extend downwardly from, the flanges 123, 123', respectively. At their lower ends, the plates 227, 228, 229, 230, are provided with short outwardly projecting horizontal wheel-spindles 231, 232, 233, 234, respectively, for operatively supporting floor-engaging rollers 235, 236, 237, 238. The wheel-spindles 231, 232, 233, 234, and the associated rollers 235, 236, 237, 238, are relatively narrow in the transverse horizontal direction so as to lie conveniently and without interference within the space between the flanges 113, 113', and the flanges 123, 123', and are of proper vertical height so as to support the extensible frame 121 in substantially horizontal nested position symmetrically within the extensible frame 111.

Similarly, the eighth extensible frame 131 is provided at its four corners with depending plates 239, 240, 241, 242, which are welded or otherwise suitably secured upon, and extend downwardly from, the flanges 133, 133', respectively. At their lower ends, the plates 239, 240, 241, 242, are provided with short outwardly projecting horizontal wheel-spindles 243, 244, 245, 246, respectively for operatively supporting floor-engaging rollers 247, 248, 249, 250. The wheel-spindles 243, 244, 245, 246, and the associated rollers 247, 248, 249, 250, are relatively narrow in the transverse horizontal direction so as to lie conveniently and without interference within the space between the flanges 123, 123', and the flanges 133, 133', and are of proper vertical height so as to support the extensible frame 131 in substantially horizontal nested position symmetrically within the extensible frame 121.

Similarly, the ninth extensible frame 141 is provided at its four corners with depending plates 251, 252, 253, 254, which are welded or otherwise suitably secured upon, and extend downwardly from, the flanges 143, 143', respectively. At their lower ends, the plates 251, 252, 253, 254, are provided with short outwardly projecting horizontal wheel-spindles 255, 256, 257, 258, respectively for operatively supporting floor-engaging rollers 259, 260, 261, 262. The wheel-spindles 255, 256, 257, 258, and the associated rollers 259, 260, 261, 262, are relatively narrow in the transverse horizontal direction so as to lie conveniently and without interference within the space between the flanges 133, 133', and the flanges 143, 143', and are of proper vertical height so as to support the extensible frame 141 in substantially horizontal nested position symmetrically within the extensible frame 131.

As will be seen by reference to Fig. 6, the several wheel assemblies at each of the corners of the extensible frames 61, 71, 81, 91, 101, 111, 121, 131, 141, are located in laterally aligned position when the several extensible frames are in inwardly drawn or nested position and are of such dimension in the transverse direction as to move in laterally spaced parallel paths without interference with each other as the several frames are shifted into outwardly extended position.

Operatively mounted upon the under face of the end plate 54 is a horizontal pulley 263, which is located approximately midway between the side rail 52 and the longitudinal center line of the guide frame 51.

Similarly, the extensible frame 61 is provided with forward and rearward horizontal pulleys 264, 265. The rear pulley 265 is located upon the upper face of the end plate 64' approximately midway between the side rail 62' and the longitudinal center line of the extensible frame 61 and the forward pulley 264 is located on the upper face of the end plate 64 in line with the rear pulley 265.

Similarly, the extensible frame 71 is provided with forward and rearward horizontal pulleys 266, 267. The rear pulley 267 is located upon the upper face of the end plate 74' approximately midway between the side rail 72 and the longitudinal center line of the extensible frame 71 and the forward pulley 266 is located on the upper face of the end plate 74 in line with the rear pulley 267.

Similarly, the extensible frame 81 is provided with forward and rearward horizontal pulleys 268, 269. The rear pulley 269 is located upon the upper face of the end plate 84' approximately midway between the side rail 82' and the longitudinal center line of the extensible frame 81 and the forward pulley 268 is located on the upper face of the end plate 84 in line with the rear pulley 269.

Similarly, the extensible frame 91 is provided with forward and rearward horizontal pulleys 270, 271. The rear pulley 271 is located upon the upper face of the end plate 94' approximately midway between the side rail 92 and the longitudinal center line of the extensible frame 91 and the forward pulley 270 is located on the upper face of the end plate 94 in line with the rear pulley 271.

Similarly, the extensible frame 101 is provided with forward and rearward horizontal pulleys 272, 273. The rear pulley 273 is located upon the upper face of the end plate 104' approximately midway between the side rail 102 and the longitudinal center line of the extensible frame 101 and the forward pulley 272 is located on the upper face of the end plate 104 in line with the rear pulley 273.

Similarly, the extensible frame 111 is provided with forward and rearward horizontal pulleys 274, 275. The rear pulley 275 is located upon the upper face of the end plate 114' approximately midway between the side rail 112 and the longitudinal center line of the extensible frame 111 and the forward pulley 274 is located on the upper face of the end plate 114 in line with the rear pulley 275.

Similarly, the extensible frame 121 is provided with forward and rearward horizontal pulleys 276, 277. The rear pulley 276 is located upon the upper face of the end plate 124' approximately midway between the side rail 122 and the longitudinal center line of the extensible frame 121 and the forward pulley 276 is located on the upper face of the end plate 124 in line with the rear pulley 277.

Similarly, the extensible frame 131 is provided with forward and rearward horizontal pulleys 278, 279. The rear pulley 279 is located upon the upper face of the end plate 134' approximately midway between the side rail 132 and the longitudinal center line of the extensible frame 131 and the forward pulley 278 is located on the upper face of the end plate 134 in line with the rear pulley 279.

The ninth extensible frame 141 is provided with a single horizontal pulley 280 located on the upper face of the rear end plate 144' and approximately midway between the side rail 142' and the longitudinal center line of such extensible frame 141. The forwardmost extensible frame 141 is, furthermore, secured directly to the forwardmost or bottom tier T of the seating-structure A by a fitting F having an elongated vertical slot $x$, which engages the bolt $b$, as shown in Fig. 5. This type of connection will transmit horizontal pushing and pulling forces to the bottom tier T of the seating-structure A without any appreciable lost motion, but will, at the same time, permit relative vertical movement between such tier T and the fitting F to allow for unevenness in the floor. Similarly, the several extensible frames 61, 71, 81, 91, 101, 111, 121, 131, 141, of the seat mover C may slide vertically with respect to each other between the several vertical slide faces 58, 58', 68, 68', 78, 78', 88, 88', 98, 98', 108, 108', 118, 118', 128, 128', 138, 138', 148, 148', to allow a reasonable degree of freedom in the vertical direction also to compensate for unevenness in the floor and similar difficulties encountered in actual installation. The forwardmost extensible frame 141 is finally provided, adjacent its forward end, with a transverse bar 281 having a central aperture 282.

Rigidly fastened at one end to the ninth extensible frame 141 is the cable or wire-rope 46 which extends rearwardly and is wound a number of times around the cable-drum 45. The other end of the cable 46 extends forwardly from the drum and is trained around the pulleys 263, 264, 265, 266, 267, 268, 269, 270, 271, 272, 273, 274, 275, 276, 277, 278, 279, 280, as shown in Figs. 12, 14 and 15. It should be noted that the cable 46 does not change level in going from one extensible frame to the other, but the level change is effected between the front and rear pulley of each frame so that the elongating and contracting relative movements of the several extensible frames will not tend to cause the cable to jump off of any of these pulleys.

The terminal end of the cable 46 is fastened into the eye 284 of an elongated take-up fitting 285 which comprises a tubular shell 286 having a threaded cap 287 at one end and at the other end being provided with a flat bottom wall 288. Integrally attached to, and extending axially outwardly from, the bottom wall 288 is a take-up rod 289 which is threaded at its remote end and extends through an aperture 282 of the bar 281 and held by nuts 290, 291, so as to provide turnbuckle action. Shiftably disposed in, and extending through, an aperture 292 formed in the cap 287 is a bar 293 provided with an enlarged head member 294, which bears slidably against the interior face of the shell 286. Disposed encirclingly around the bar 293 is a spring 295 which abuts at one end against the head member 294 and at the other end against the bottom wall 288 so as to urge the head member 294 toward the bottom wall 288. The bar 292 is provided along its length with a plurality of spaced notches 296, any one of which may be engaged by a spring-biased detent pin 297 operatively mounted on the cap 287. When any slack develops in the cable 46, the spring 295 pushes the take-up frame forward one or more notches with respect to the bar 293, but the detent pin 297 will prevent return movement, so that when the cable-drum 45 is rotated in the appropriate direction, the pull of the cable 46 will be exerted directly on the ninth extensible frame 141 to shift it, as will be presently more fully described.

As will be seen by reference to Figs. 9 and 12, the various pulleys 263, 264, 265, 266, 267, 268, 269, 270, 271, 272, 273, 274, 275, 276, 277, 278, 279, 280, are aligned lengthwise of the seat mover C so that the runs of cable extending therebetween will be parallel to the longitudinal axis of the seat mover C so that there will be no lateral forces imposed on the several extensible frame 61, 71, 81, 91, 101, 111, 121, 131, 141, as the cable 46 is pulled in by the cable drum 45. Consequently, the extensible frames 61, 71, 81, 91, 101, 111, 121, 131, 141, will all move in a true straight line as the seat mover C opens up.

It will also be noted in this connection that the cable 46 is actually fastened at both of its ends to the ninth extensible frame 141 so that, irrespective of which direction the cable is moving, it will never, at any time, be loose and the same length of the cable 46 will, at all times, be wound around the drum. Consequently, the seat mover C will, in effect, be "self-locking." In other words, whenever the motor M is stopped, the seat mover C will also stop and remain immovably in such stopped position. As a result, the seating-structure A, which is actuated by the seat mover C, will similarly be held in a comparable position. If, for example, the seat mover C is shifted outwardly to half of its total extended distance and the motor M is then stopped, both the seat mover C and the seating-structure A will be locked in such "half-open" position. Since the several tiers T of the seating-structure A normally will open in successive order, the lowermost tier T will move outwardly first to the full extent of its travel with respect to the second tier T directly above. As soon as the first tier T has moved out to the full limit of its travel with respect to the second tier T, it will then begin to pull the second tier T outwardly after it. Consequently, if the seating-structure A is "half-open," the lower ten tiers T will be opened out or extended into seat-forming position. Obviously, by stopping the seat mover C at any desired position, it is possible to have any number of tiers T open for use from one on up to the total of twenty-one. Since the seat mover C will remain immovably "locked," so to speak, in any extended position, the entire seating-structure A will be comparably held immovably in such fully opened or partially opened position.

In use, the switch control, which, as above pointed out, may be located in any convenient position within the gymnasium and is of the conventional forward-and-reverse type, can be manually actuated to energize the motor M. Assuming that the seating-structure A is in closed position, as shown in Fig. 2, the switch control will be closed in the appropriate manner so as to cause the motor M to rotate in such direction as to impart a counter-clockwise rotation to the cable-drum 45 (reference being made to Fig. 5). The cable 46 will, thereupon, be wound around the cable-drum 45 and the end thereof which is trained around the several pulleys 263, 264, 265, 266, 267, 268, 269, 270, 271, 272, 273, 274, 275, 276, 277, 278, 279, 280, will, in a manner of speaking, be pulled rearwardly and shortened, while, at the same time, the other end of the cable 46, that is to say the end which is fastened to the take-up fitting 285, will be fed forwardly off the other end of the cable-drum 45. As a result of this movement of the cable, the several extensible frames 61, 71, 81, 91, 101, 111, 121, 131, 141, will be shifted from the closed or nested position shown diagrammatically in Fig. 15 to the open or extended position shown diagrammatically in Fig. 14, thereby opening the seating-structure A to fully extended position. This movement to open or extended position may be described in more specific detail by reference to Figs. 5, 6, 8, and 15. As the motor M is energized, for opening up the seating-structure A, the cable-drum 45 will be rotated in a counter-clockwise direction (reference being made to Fig. 5). This rotary movement of the cable-drum 45 will cause the terminal end of the cable 46, i.e. the end of the cable which is fastened into the eye 284 of the elongated take-up fitting 285, to pay outwardly, that is to say toward the left (reference again being made to Fig. 5). Simultaneously, the opposite end of the cable 46 which is wrapped in serpentine fashion around the various pulleys 263, 264, 265, 266, 267, 268, 269, 270, 271, 272, 273, 274, 275, 276, 277, 278, 279, 280, will be drawn up through this system of pulleys. Since the various frames 61, 71, 81, 91, 101, 111, 121, 131, 141, are nested in successively underlying relationship, as schematically shown in Fig. 15, this movement of the cable 46 through the system of pulleys 263, 264, 265, 266, 267, 268, 269, 270, 271, 272, 273, 274, 275, 276, 277, 278, 279, 280, will initially produce movement only of the lowermost frame 141, causing the latter to move outwardly to the left (reference being made to Fig. 15), until the stop abutments s, s', at the rear thereof come into abutting engagement with the stop-forming heads 140, 140', which are located at the front portion of the next adjacent frame 131. Thereupon, the continued feeding of the cable 46 around the cable-drum 45 will, in effect, cause the frame 141 to "pick up" the frame 131 and carry the latter outwardly to the left. This outward translation or movement of the frame 131 will then continue until the stop abutments s, s', thereof come into engagement with the stop-forming heads 130, 130', of the next adjacent frame 121. Thereupon, the frame 121 is "picked up" and shifted outwardly together with the frames 141, 131. In this manner, the outwardly shifting movement is continued and each successive frame 111, 101, 91, 81, 71, and 61, is successively "picked up" until the entire structure is fully extended, as shown in Fig. 14. Upon retractive movement, the same series of operations takes place. The motor M is appropriately energized so that the cable-drum 45 will be rotated in a clockwise direction (reference again being made to Fig. 5). The cable-drum 45, when thusly rotated, will pull in the straight or internal end of the cable 46, that is to say, draw it in from left to right (reference being made to Figs. 13 and 14), and pay it out again in the opposite direction into the system of pulleys 263, 264, 265, 266, 267, 268, 269, 270, 271, 272, 273, 274, 275, 276, 277, 278, 279, 280. The inward pulling movement of the internal end of the cable 46 initially pulls the outermost frame 141 inwardly, i.e. to the right (reference being made to Figs. 13 and 14), and the opposite end of the cable is gathered in a serpentine convolution within the frame 141 around the pulley 280. As soon as the frame 141 reaches its rearwardmost position, that is to say, is fully nested within and beneath the frame 131, it will, in effect, "pick up" the frame 131 and the two will continue inward movement, i.e. to the left (reference being made to Figs. 13 and 14) until the two frames 141, 131, are fully nested within or beneath the frame 121. Thereupon, the frame 121, will, in turn, be "picked up" and carried rearwardly with the other two frames. This series of operations will continue until the frames 111, 101, 91, 81, 71, and 61, are successively "picked up" in turn and all the frames are nested one within the other in the fully retracted position shown in Figs. 5 and 15.

If desired, the switch control can be released at any point during the outward travel of the seating-structure A if it is desired to have less than the total number of tiers T opened for use. It, of course, should be noted in this connection that, for safety reasons, the switch control should be of the usual spring-biased type which will shift back to off position whenever manually released. When it is necessary or desirable to withdraw the seating-structure A into closed position, the switch control is manually pressed to reverse the motor M, thereby turning the cable-drum 45 in the opopsite direction so that the end of the cable 46 which is attached to the take-up fitting 285 will be pulled in and the opposite end of the cable 46 will be fed forwardly off the drum. The inward pulley movement of the end of the cable 46 attached to the take-up fitting 285 will, of course, pull the ninth extensible frame 141 inwardly and the other end of the cable 46 will, in effect, be taken up in the convolutions around the several pulleys 263, 264, 265, 266, 267, 268, 269, 270, 271, 272, 273, 274, 275, 276, 277, 278, 279, 280. When the seating-structure A is withdrawn to any desired intermediate position or reaches the fully nested position shown in Fig. 2, the switch control is manually released and the motor M will, accordingly, stop rotation.

As previously pointed out, the rotation of the cable-drum 45 will, at the same time, cause the cable-drum 45 to traverse axially along the shaft 42, so that the incoming and outgoing portions of the cable 46 will always lie in the same straight lines.

The seat mover C is equally capable of being adapted to other types of folding gymnasium seating-structures which can be pushed outwardly from a closed position against the wall to an open position extending outwardly into the gymnasium. In the telescoping seating-structure A above described, the various tiers T nest one within the other when the seating-structure A is in closed position and, in such closed position, the various seat-boards 9, 9', are in vertical registration or at least in vertically registering groups, depending upon the size and number of seats employed. Some other types of folding seating-structures which are commercially available close up accordian-wise so that the various vertical posts or structural support-frames lie one in front of the other. The seat mover C of the present invention is quite universal in the sense that it can be utilized in connection with practically all existing types of telescoping and folding gymnasium seating-structures, inasmuch as it is relatively low, flat and does not take up a great deal of space in comparison to the overall size of the seating-structures with which it can be utilized.

It should be understood that changes and modifications in the form, construction, arrangement, and combination of the several parts of the power actuated movers for telescoping gymnasium seat-structures may be made and substituted for those herein shown and described without departing from the nature and principle of my invention.

Having thus described my invention, what I claim and desire to secure by Letters Patent is:

1. In an extensible seating-structure adapted to shift across a floor or similar support, a stationary main frame, a plurality of second frames relatively movable with respect to the main frame and to one another each including uprights spaced transversely of the structure, said uprights being normally elevated from the support and being vertically yieldable under load for endwise resting upon the support, said frames each including a seat-member extending transversely of the structure, said main and second frames being shiftably interconnected for relative movement from a retracted position to an extended position, said seat-members being disposed in a stepped series when the structure is horizontally extended and substantially in vertical registration when the structure is retracted, an extensor having a stationary chassis immovably associated with the main frame, said extensor also having a moving end attached to the outermost second frame, and power driven means operatively associated with the extensor and optionally shifting the moving end thereof relatively toward and away from the stationary chassis thereof whereby to shift the seating structure optionally to extended and retracted positions depending upon the direction of movement of the extensor.

2. An extensible seating-structure according to claim 1 wherein the moving end of the extensor is operatively connected to the stationary chassis by a plurality of telescoping extensible elements.

3. An extensible seating-structure according to claim 2 wherein the power-driven means includes a cable-drum and a flexible cable trained around the cable-drum, one end of said cable leading off the cable-drum and extending directly forwardly therefrom, said end being attached to the moving end of the extensor, said telescoping elements being provided at their forward and rearward ends with pulleys, the other end of the cable running off of the drum and being trained in a serpentine manner around the pulleys and being ultimately fastened to the moving end of the extensor whereby when the cable-drum is rotated in one direction the moving end and telescoping elements of the extensor will be pushed outwardly into extended position and when the drum is rotated in the opposite direction the moving end and telescoping elements of the extensor will be pulled inwardly into retracted position, as a result of which optional movements the frames of the seating-structure will be moved respectively from folded to unfolded position and from unfolded position to folded position depending upon the direction of rotation of the cable-drum.

4. An extensible seating-structure according to claim 1 wherein the power-driven means includes cable and pulley means for shifting said frames from folded to unfolded position.

5. An extensible seating-structure comprising a stationary back-frame and a plurality of extensible frames sized for nested disposition one within the other and being relatively movable with respect to the stationary back frame and to one another so that when the frames are nested the entire structure is in a compact closed position, said extensible frames being adapted, upon relative movement outwardly with respect to the back-frame, to move into an extended position in which one of the frames is outermost with respect to all of the others, seat means carried by each frame for use when the frames are extended, and an extensor having a stationary chassis adapted for disposition within the back-frame, and a plurality of telescopic elements slidably mounted in the chassis and being adapted to move outwardly one with respect to another into an extended position in which the outermost telescopic element is located in a position substantially remote from the stationary chassis, means for securing said last-named telescopic element to the extensible frame which is outermost when the seating-structure is in extending position for optionally imparting inward and outward movement to the extensible frames whereby to shift said extensible frames from closed position to extended position and from extended position to closed position.

6. A seat mover for use with telescopic bleachers having a section adapted for fixed mounting to a building structure, said seat mover comprising a stationary main chassis adapted for fixed mounting to the building structure, a plurality of extensible sections disposed within the chassis and nested one within the other for relative horizontal sliding movement with respect to one another, first bearing means interposed between each of the extensible sections for confining the several extensible sections to outward and inward movement in relation to each other along a straight horizontal path and second bearing means interposed between each of the extensible sections for permitting relative up-and-down movement between the extensible sections as they shift horizontally, at least one of said sections being operatively connected to the telescopic bleacher whereby to extend the telescopic bleacher from a closed position to an open position and retract the telescopic bleacher from an open position to a closed position, and power actuated means for shifting the sections horizontally relatively to each other.

7. A seat mover for use with telescopic bleachers having a section adapted for fixed mounting to a building structure, said seat mover comprising a stationary main chassis adapted for fixed mounting to the building structure, a plurality of horizontally extensible sections slidably disposed within the chassis and nested one within the other, bearing means interposed between the extensible sections for confining the several extensible sections to horizontal movement in relation to each other and at the same time permitting limited relative movement between the extensible sections in a substantially vertical direction, at least one of said sections being operatively connected to the telescopic bleacher whereby to extend the telescopic bleacher from a closed position to an open position and retract the telescopic bleacher from an open position to a closed position, and power actuated means for shifting the sections relatively to each other.

8. A seat mover for use with telescopic bleachers having a section adapted for fixed mounting to a building structure, said seat mover comprising a stationary main chassis adapted for fixed mounting to the building structure, a plurality of extensible sections slidably disposed within the chassis and nested one within the other, bearing means interposed between the extensible sections, at least one of said sections being operatively connected to the telescopic bleacher whereby to extend the telescopic bleacher from a closed position to an open position and retract the telescopic bleacher from an open position to a closed position, and self-locking power actuated means for shifting the sections relatively to each other.

9. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached at both ends to one of the extensible sections, and power-driven means for rotating the drum.

10. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each seciton is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached at both ends to the extensible section which is furthest removed from the chassis when the sections are extended, and power-driven means for rotating the drum.

11. A seat mover for use with foldable seating-structures and the like, said seat mover comprising a stationary main chassis, a plurality of extensible sections slidably disposed within the chassis and nested one within the other, bearing means interposed between the extensible sections, a drum rotatably and shiftably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached at both ends to one of the extensible sections, means for shifting the drum to-and-fro as it rotates so that the direction of approach and departure of the cable with respect to the drum will remain constant, and power-driven means for rotating the drum.

12. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached fixedly at one end and adjustably at the other end to one of the extensible sections, and power-driven means for rotating the drum.

13. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached fixedly at one end to one of the extensible sections and at the other end being attached to the same extensible section by a spring-biased rod, and power-driven means for rotating the drum.

14. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached fixedly at one end to one of the extensible sections and at the other end being attached to the same extensible section by a take-up device comprising a casing having means for attachment to the last-named extensible section, a rod shiftably mounted in the casing and projecting outwardly thereof for attachment to the cable, a spring in the casing for biasing the rod inwardly with respect to the casing and detent means operatively mounted on the casing for holding the rod against outward movement in respect to the casing, and power-driven means for rotating the drum.

15. A seat mover for use with foldable seating-structures and the like, said seat mover comprising a stationary main chassis, a plurality of extensible sections slidably disposed within the chassis and nested one within the other, bearing means interposed between the extensible sections, a drum rotatably mounted on the chassis, front and rear pulleys operatively mounted on each extensible section in such manner that the rear pulley of each section is always located rearwardly of the front pulley of the next adjacent section within which such section is nested, a cable trained around the several pulleys in a continuous serpentine course and also being wrapped for a plurality of turns around the drum and running thence off the drum in a straight course, said cable furthermore being attached fixedly at one end to one of the extensible sections and at the other end being attached to the same extensible section by a take-up device comprising a casing having means for attachment to the last-named extensible section, a rod shiftably mounted in the casing and projecting outwardly thereof for attachment to the cable, a spring in the casing for biasing the rod inwardly with respect to the casing and spring-pressed detent means operatively mounted on the casing for holding the rod against outward movement in respect to the casing, and power-driven means for rotating the drum.

16. A seat mover for use with telescopic bleachers having a section adapted for fixed mounting to a building structure, said seat mover comprising a stationary main chassis adapted for fixed mounting to the building structure, a plurality of extensible sections slidably disposed within the chassis and nested one within the other, bearing means interposed between the extensible sections, power actuated means for shifting the sections relatively to each other, and means for shiftably connecting the seat mover to the seating-structure, said means being adapted for limited vertical movement between the seating-structure and the seat mover.

17. A seat mover for use with telescopic bleachers having a section adapted for fixed mounting to a building structure, said seat mover comprising a stationary main chassis adapted for fixed mounting to the building structure, a plurality of extensible sections slidably disposed within the chassis and nested one within the other, each of said extensible sections being provided with depending rollers for operative engagement with the floor upon which the seating-structure rests, bearing means interposed between the extensible sections, and power actuated means for shifting the sections relatively to each other.

References Cited in the file of this patent

UNITED STATES PATENTS

| | | |
|---|---|---|
| 514,476 | Austin | Aug. 14, 1894 |
| 1,213,242 | Overly | Jan. 23, 1917 |
| 1,301,107 | Curtis | Apr. 22, 1919 |
| 1,685,697 | Guerin | Sept. 25, 1928 |
| 1,841,958 | Kendall | Jan. 19, 1932 |
| 2,147,564 | Vance | Feb. 14, 1939 |
| 2,489,274 | Donald | Nov. 29, 1949 |
| 2,846,738 | Walworth | Aug. 12, 1958 |
| 2,851,179 | Vance | Sept. 9, 1958 |
| 2,877,507 | Walworth | Mar. 17, 1959 |

FOREIGN PATENTS

| | | |
|---|---|---|
| 154,709 | Australia | Jan. 17, 1952 |

OTHER REFERENCES

Architectural Record, page 87, February 1954.
Progressive Architecture, page 157, November 1954.